UNITED STATES PATENT OFFICE.

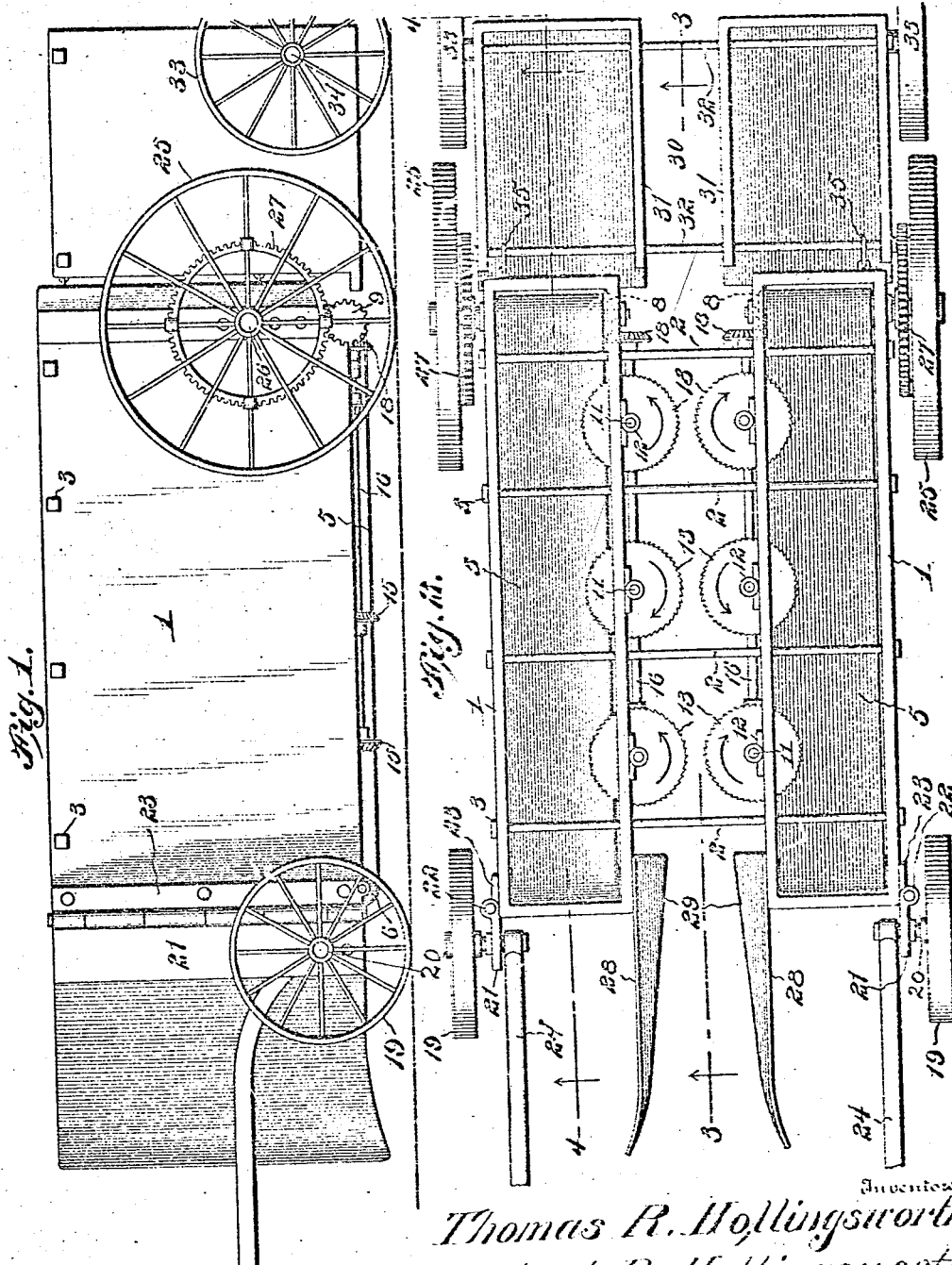

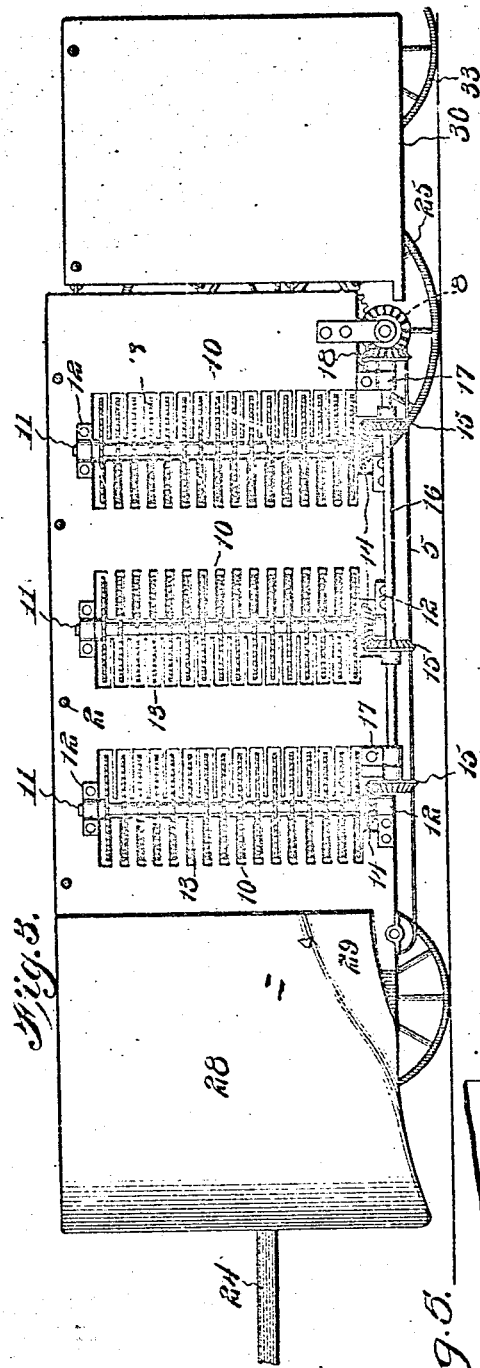

THOMAS R. HOLLINGSWORTH AND ROBERT D. HOLLINGSWORTH, OF WATERS, ARKANSAS.

COTTON-HARVESTER.

No. 898,893.    Specification of Letters Patent.    Patented Sept. 15, 1908.

Application filed August 15, 1907. Serial No. 388,671.

*To all whom it may concern:*

Be it known that we, THOMAS R. HOLLINGSWORTH and ROBERT D. HOLLINGSWORTH, citizens of the United States, residing at Waters, in the county of Montgomery and State of Arkansas, have invented new and useful Improvements in Cotton-Harvesters, of which the following is a specification.

Our invention is an improved cotton harvester adapted for use in the cotton fields for picking the cotton from the bolls of the standing plant and it consists in the construction, combination and arrangement of devices hereinafter described and claimed.

In the accompanying drawings, Figure 1 is a side elevation of a cotton harvesting machine constructed in accordance with our invention. Fig. 2 is a top plan view of the same. Fig. 3 is a vertical longitudinal sectional view of the same taken on the plane indicated by the line 3—3 of Fig. 2. Fig. 4 is a similar view taken on the plane indicated by the line 4—4 of Fig. 2. Fig. 5 is a detail perspective view of one of the forwardly extending wings which operate at the front ends of the boxes to raise or lower limbs of the cotton plants and such plants as may have fallen.

The frame or body of our improved cotton harvesting machine is constructed as follows: A pair of boxes 1 are arranged abreast of each other at a suitable distance apart and are here shown as connected together by a series of transversely disposed rods 2, on each of which are adjusting nuts 3 which may be employed for widening or narrowing the space between the boxes. Each box is here shown as open at its upper side and as provided in its rear side near the bottom with an opening 4. The bottom of each box is formed by the upper lead of an endless conveying apron 5. Each of the said aprons is supported by a pair of rollers 6—7 which are respectively mounted at the front and rear ends of the box. Each of the rear rollers 7 is provided at the inner end of its shaft with a miter gear wheel 8 and is provided at the outer end of its shaft with a pinion 9. The said boxes have their inner side walls provided with narrow longitudinally disposed openings 10 which are arranged in vertical series. Vertically disposed shafts 11 are journaled in bearings 12, which are here shown as secured to the said walls and each of the said shafts is provided with a plurality of cotton picking saws 13 which are similar to the gin saws usually employed in cotton gins. The said saws project through the openings in the inner walls of the boxes and also project into the space between the said boxes. Each of the shafts 11 is provided near its lower end with a miter gear 14. Said miter gears engage similar gears 15 on horizontally disposed shafts 16 which are mounted in bearings 17 that are secured to the inner sides of the boxes. Said shafts 16 are provided at their rear ends with miter gears 18 which engage the gears 8 at the inner ends of the rear rollers 7. Front supporting and guide wheels 19 for the machine are mounted on spindles 20 that project outwardly from the free front members 21 of the hinge devices 22, the rear members 23 of which are bolted or otherwise suitably secured to the outer sides of the boxes 1 at the front corners thereof. Draft devices 24 for the team are pivotally attached to the inner ends of said spindles 20. Said draft devices may be tongues or shafts as may be preferred.

The rear supporting wheels 25 are mounted on spindles 26 which project from the outer sides of the boxes, near their rear ends. Secured to each of said wheels 26, for rotation thereby, is a gear wheel 27 which engages the pinion 9 of one of the rollers 7, so that as the machine advances, motion is imparted to the conveying aprons to cause their upper leads to travel rearwardly and the picking saws are geared to the said rollers by means hereinbefore described. Said picking saws are also revolved in the directions indicated by the arrows in Fig. 2.

On the inner side of each box 1, at the front end thereof, is a forwardly extending wing 28. The said wings have their lower ends bent or deflected to provide rearwardly and upwardly extending surfaces 29 which serve, as the machine moves along with its boxes astride of a row of cotton plants, to raise the lower limbs of the cotton plants and such plants as may have fallen and cause all of the plants in the row and all of the limbs of such plants to be presented to the action of the picking saws which operate on opposite 1c sides of such row, so that such picking saws will pull the cotton from the bolls, carry the cotton through the openings in the inner side walls of the boxes and drop the same upon the endless conveyer aprons, which latter will serve to discharge the cotton from the said boxes through the rear openings 4.

In order to collect the cotton which is thus harvested by the machine, we provide a truck or tender 30 which is here shown as composed of a pair of boxes 31, each open at its front end, connected together by screw rods 32 similar to the rods 2, hereinbefore described. The said boxes are provided with supporting wheels 33 which are mounted on spindles 34 that project through the outer sides of the boxes near their lower corners. The said boxes are connected to the rear ends of the boxes 1 of the harvesting machine by hooks or other suitable devices 35, which are herein shown as engaging the screw rods 32.

It will be understood that the cotton, which is discharged from the boxes 1 of the harvesting machine, will accumulate in the boxes 31 and may be removed from such boxes 31 from time to time as convenient.

Having thus described the invention, what we claim as new and desire to secure by Letters Patent is:—

1. A cotton harvesting machine having a pair of boxes spaced apart to move on opposite sides of a row of cotton plants, said boxes having narrow openings in their opposing sides, and revolving cotton picking saws each projecting through one of such openings.

2. A cotton harvesting machine having a pair of boxes spaced apart to move on opposite sides of a row of cotton plants, said boxes having narrow openings in their opposing sides, vertically disposed shafts mounted on the outer sides of the opposing walls of such boxes, cotton picking saws on such shafts, each projecting through one of such openings, and means to revolve such shafts.

3. A cotton harvesting machine having a box provided with narrow horizontal openings in one side, revolving cotton picking saws each extending through one of such openings, and a conveyer in the bottom of such box to carry cotton therefrom.

4. A cotton harvesting machine having a box provided with narrow horizontal openings in one side, revolving cotton picking saws each extending through one of such openings, a conveyer in the bottom of such box to carry cotton therefrom, and a cotton-receiving box detachably connected to the rear end of the first mentioned box and to which cotton is carried by such conveyer.

5. A cotton harvesting machine having a pair of boxes spaced apart to move on opposite sides of a row of cotton plants and provided with openings in their opposite sides, revoluble cotton picking saws extending through said openings, supporting wheels for such boxes, gears actuated by certain of said supporting wheels to drive such saws, and deflecting wings at and projecting forwardly from the front ends of the boxes, diverging from the inner front corners thereof, said deflecting wings provided at their lower ends with rearwardly and upwardly extending surfaces, for the purpose set forth.

6. A cotton harvesting machine having a pair of boxes spaced apart and provided with openings in their opposing sides, vertical shafts mounted on the inner sides of such boxes and having cotton picking saws extending through such openings, horizontally disposed shafts having their bearings on such boxes and geared to such vertical shafts, carrier devices in the bottoms of such boxes, each geared to one of such horizontally disposed shafts, supporting wheels for the said boxes, gears connecting certain of such supporting wheels of such carrier devices to drive the latter, and deflecting wings at the front ends of the boxes, diverging from the inner front corners thereof, provided at their lower ends with rearwardly and forwardly extending surfaces, said wings serving to direct plants between the said boxes and to the action of said saws, substantially as described.

In testimony whereof, we affix our signatures in presence of two witnesses.

THOMAS R. HOLLINGSWORTH.
ROBERT D. HOLLINGSWORTH.

Witnesses:
J. E. CHATTERTON,
A. X WILLIAMS.
  His mark.